Patented Jan. 9, 1934

1,942,902

UNITED STATES PATENT OFFICE 1,942,902

LACQUER AND PROCESS OF MAKING THE SAME

Leo Roon, Great Neck, N. Y., assignor to Roxalin Flexible Lacquer Company, Incorporated, Long Island City, N. Y., a corporation of New York No Drawing. Application October 16, 1930
Serial No. 489,235

5 Claims. (Cl. 134—79)

This invention relates to lacquers and is directed, more particularly, to the incorporation of carnauba wax and similar natural and synthetic hard waxes into cellulose ester lacquers.

Waxes of the character specified have long been employed as the principal and basic ingredients of the so-called wax finish polishes, polishing waxes, floor waxes, liquid waxes, all of which have been employed to produce wax-like surfaces. The beautiful finishes susceptible of accomplishment through use of carnauba wax are highly desirable for a wide variety of uses and attempts have been made to incorporate this substance into cellulose ester lacquers for use where wax finishes are wanted. These attempts have, however, resulted, prior to this invention, in absolute failure, due, primarily, to the fact that waxes of this nature are incompatible with cellulose ester lacquer and all attempts to cause the various ingredients to thoroughly mix and enter into solution have been unsuccessful.

My research and experimentation, extending over a protracted period, have convinced me that carnauba wax and its substitutes, may be satisfactorily blended with cellulose ester lacquer and are not incompatible therewith. I have discovered that when the wax is broken up and the particle size reduced sufficiently, it will so efficiently blend with cellulose ester lacquer that no gross particles are present in the resulting finish which is hard and durable and has the appearance of a hard wax finish.

The practical advantage of this invention is that I am able to obtain through inexpensive brush or spray gun application a finish which has heretofore been possible of accomplishment only by arduous and expensive waxing methods. Furthermore, in my finish, the finish is uniform throughout the depth of the lacquer-wax coating, whereas, in the conventional wax finish, the wax is merely deposited, so to speak, upon the surface.

I believe I am the first to successfully incorporate a hard wax such as carnauba wax, into cellulose ester lacquers to produce a marketable and commercial product and this invention includes such a lacquer including carnauba wax and similar natural and synthetic hard waxes as an ingredient. The invention, moreover, further consists in novel and efficient methods, whereby this product may be produced.

According to one commercial method of this invention, which may be termed the cold method, the wax is reduced by first crushing and coarse grinding the large lump of wax to approximately 20 mesh to the inch size. The resulting coarse powder is then placed in a closed pebble mill and ground in the presence of a solvent such as butyl acetate, ethyl acetate, etc., to which may be added a quantity of nitro cellulose. Without limiting this invention to specific proportions, I may here state that I have obtained very satisfactory results through the employment with 150 pounds of carnauba wax, of 38 gallon butyl acetate with the addition of 15 pounds of dry nitro cellulose. The addition of nitro cellulose, while desirable, is not, however, essential to the process. The grinding in the pebble mill, as stated, is continued for the purpose of reducing the particle size of the wax until such time as a sample taken from the batch indicates that the product is smooth enough for use. This generally requires from 24 to 60 hours, depending upon the type of mill employed.

At the end of this grinding operation, there is a resulting mass composed of approximately 33.8 per cent by weight of finely divided carnauba wax, approximately 62.8 per cent by weight of butyl acetate, and approximately 3.4 per cent by weight of nitro-cellulose.

The resulting product is mixed and blended by agitation with the desired quantity of conventional cellulose ester lacquer and is thereupon ready for application by brush or spray gun.

Another method of preparation which may be followed and which I term the hot process is as follows. The wax is first disintegrated by melting and while in melted condition is poured into any organic solvent which is compatible with a cellulose ester lacquer. The solvent may, however, be poured into the melted wax. The mass is agitated continuously until it cools to room temperature. If not sufficiently smooth for use at this stage of the process, the mass is placed in a mill, preferably a pebble mill, and the particles are reduced, either with or without the addition of nitro cellulose as in the cold process, until the particle size of the wax is sufficiently small to produce the desired blend. In carrying out this second mentioned process, I have found that a very satisfactory breaking up or reduction of the wax particles may be accomplished during the so-called agitation step by causing the mass, while cooling, to circulate rapidly, e. g. through rotary or centrifugal pumps. The mechanical operation of the pumps appears to exert a pronounced smoothing action on the wax and a very satisfactory reduction of particle size may be accomplished in this manner. The mechanical circulation and agitation may be practised in both the cold and hot processes and in the latter the circulation of the mass may be continued after the mass has cooled to room temperature and until such time as the desired and necessary smoothness is obtained. In any event, the wax, after being reduced and smoothed as stated is added to the conventional cellulose ester lacquer and is then ready for use.

Lacquer made according to the present invention as herein described has an opaque, cloudy appearance at all atmospheric temperatures, due to the dispersion of the carnauba wax in solid particle form and the further fact that the carnauba wax is substantially insoluble in the other constituents of the composition.

Lacquer made according to this invention, as described, is a thoroughly commercial product. It is readily applied to the surface to be finished in the same manner as other lacquers and dries with a hard wax finish, free from lustre and possessing qualities superior to those obtained from applying a conventional wax and then polishing the same. Furthermore, the superior finish to which I have referred is obtained economically and expeditiously, without the expense and drudgery required to apply wax finishes as formerly.

The best, most economical and efficient manner of making the product of this invention is to prepare the wax separately and thereafter mix it with the lacquer as hereinbefore described, but it is within the purview of this invention to place, grind and mix the wax, as hereinbefore described, in the presence of the constituents of the lacquer formula, so as to manufacture the whole simultaneously.

So far as I am aware the use of waxes in dispersion in cellulose ester lacquers is novel per se and I do not limit the present invention to any particular wax. However, where carnauba wax is referred to in the appended claims, I wish this to be understood as including similar natural and synthetic waxes, which are hard and have the general characteristics and properties of carnauba wax.

Having thus fully described the invention, what I claim as new and desire to secure by Letters Patent is:

1. As a new article of manufacture, a cellulose ester lacquer having in suspension therein substantially uniformly dispersed finely divided solid particles of carnauba wax, said wax being substantially insoluble in the other ingredients of the lacquer at atmospheric temperatures and said lacquer remaining opaque with the wax in substantially uniformly dispersed solid particles at all atmospheric temperatures.

2. As a new article of manufacture, a composition of matter comprising approximately 33.8 per cent by weight of finely divided carnauba wax, approximately 62.8 per cent by weight of butyl acetate, and approximately 3.4 per cent by weight nitro-cellulose, thoroughly admixed with one another and blended with cellulose ester lacquer in such proportions as to produce a finish substantially free from luster and one wherein the wax is substantially insoluble in the constituents of the composition.

3. As a coating composition, a cellulose ester lacquer comprising nitro-cellulose, a solvent mixture in which carnauba wax is substantially insoluble, and added carnauba wax in uniformly dispersed solid particle form in the lacquer in such proportions as to produce a finish substantially free from luster.

4. An article of manufacture having a surface furnished with the coating composition substantially as set forth in claim 3.

5. A new article of manufacture comprising a cellulose ester lacquer and an undissolved carnauba wax in uniformly dispersed solid particle form throughout the lacquer in such proportion as to produce a finish substantially free from luster.

LEO ROON.